United States Patent
Bogdan et al.

(10) Patent No.: US 6,365,566 B1
(45) Date of Patent: Apr. 2, 2002

(54) AZEOTROPE-LIKE COMPOSITIONS OF PENTAFLUOROBUTANE AND WATER

(75) Inventors: Mary C. Bogdan, Buffalo; Hang T. Pham, Amherst; Hsueh Sung Tung, Getzville; David J. Williams, East Amherst; Leslie Bement, Buffalo, all of NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/813,495

(22) Filed: Mar. 21, 2001

(51) Int. Cl.⁷ .............................. C08J 9/14; B29C 44/24
(52) U.S. Cl. ...................... 510/411; 510/408; 521/131
(58) Field of Search ............................. 521/107, 125, 521/130, 131; 510/177, 288, 411, 412, 415, 408; 134/40; 252/182.24, 182.25

(56) References Cited

U.S. PATENT DOCUMENTS

| | | | | |
|---|---|---|---|---|
| 5,099,081 A | * | 3/1992 | Bolmer et al. | |
| 5,445,757 A | * | 8/1995 | Pennetreau | |
| 5,478,492 A | * | 12/1995 | Barthelemy et al. | |
| 5,866,626 A | * | 2/1999 | Blanpied et al. | |
| 5,948,174 A | * | 9/1999 | Barthelemy et al. | |
| 6,210,602 B1 | * | 4/2001 | Barthelemy et al. | |

* cited by examiner

*Primary Examiner*—Yogendra N. Gupta
*Assistant Examiner*—Gregory E. Webb
(74) *Attorney, Agent, or Firm*—Colleen D. Szuch

(57) ABSTRACT

This invention provides azeotropic and azeotrope-like compositions of 1,1,1,3,3-pentafluorobutane and water that are environmentally desirable for use as blowing agents and solvents.

9 Claims, 1 Drawing Sheet

AZEOTROPE-LIKE COMPOSITIONS OF PENTAFLUOROBUTANE AND WATER

FIELD OF THE INVENTION

Figure 1:
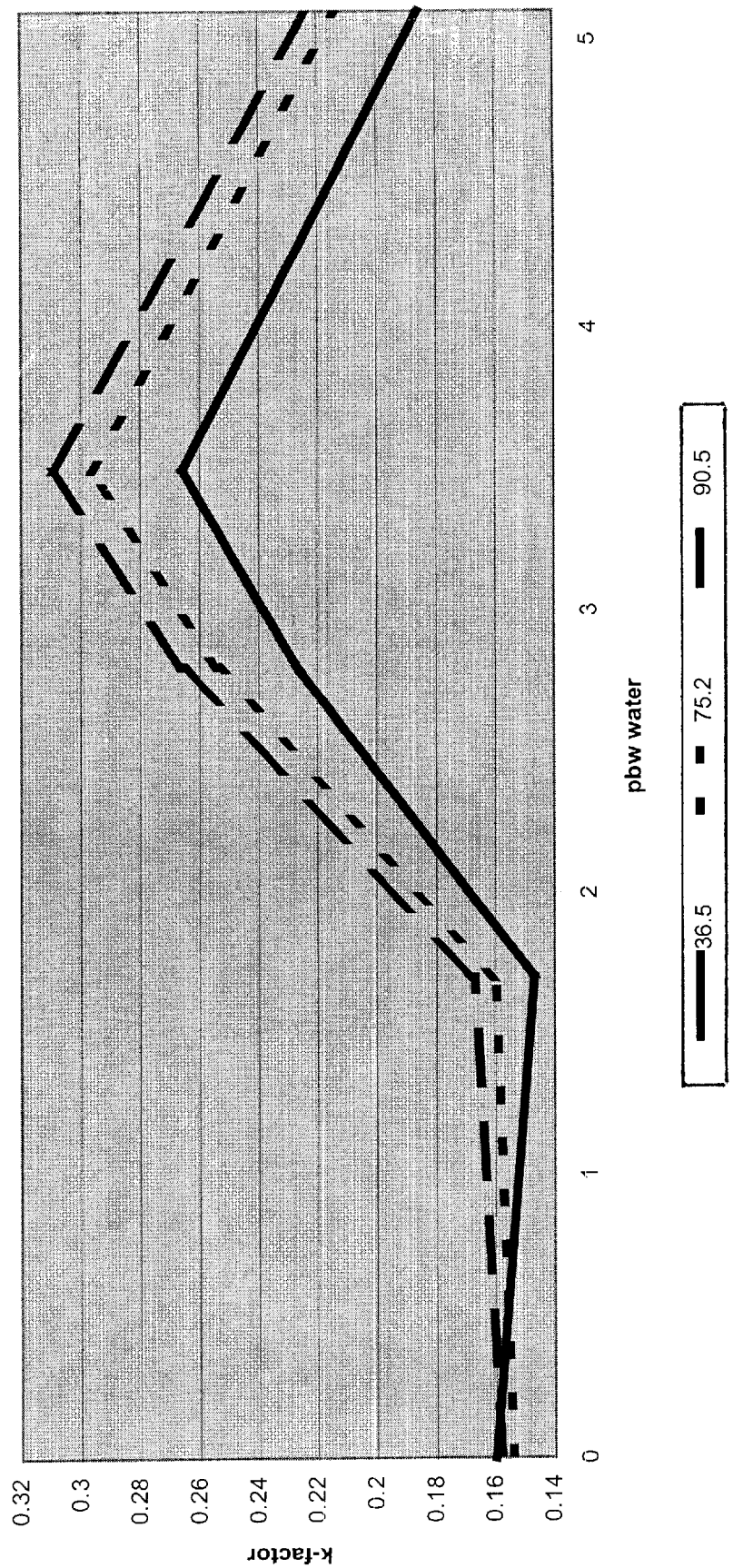

The present invention relates to mixtures of 1,1,1,3,3-pentafluorobutane ("HFC-365mfc") and water. More particularly, the invention provides compositions of HFC-365mfc and water that are environmentally desirable for use as blowing agents, solvents and aerosol propellants.

BACKGROUND

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, especially chlorofluorocarbons ("CFC's"), it is desirable to use fluids of lesser ozone depletion potential such as hydrofluorocarbons, ("HFC's") and/or hydrochlorofluorocarbons ("HCFC's).

Thus, the use of fluids that do not contain CFC's or contain HCFC's or HFC's instead of CFC's is desirable. Additionally, it is known that the use of single component fluids or azeotropic mixtures, which mixtures do not fractionate on boiling and evaporation, is preferred. However, the identification of new, environmentally safe, azeotropic mixtures is complicated due to the fact that it is difficult to predict azeotrope formation.

The art continually is seeking new fluorocarbon based mixtures that offer alternatives, and are considered environmentally safer substitutes for CFC's and HCFC's. Of particular interest are mixtures containing a hydrofluorocarbon and a non-fluorocarbon, both of low ozone depletion potentials. Such mixtures are the subject of this invention.

SUMMARY

This invention provides azeotrope-like and compositions of HFC-365mfc and water. The compositions of the invention provide environmentally desirable replacements for currently used CFC's and HCFC's since HFC-365mfc and water have zero ozone depletion potentials. Additionally, the compositions of the invention exhibit characteristics that make the compositions better CFC and HCFC substitutes than either HFC-365mfc or water alone.

In one embodiment, the invention provides azeotropic or azeotrope-like compositions comprising effective amounts of HFC-365mfc and water. By "effective amounts" is meant the amount of each component that, on combination with the other component, results in the formation of an azeotropic or azeotrope-like composition. The invention further provides azeotrope-like compositions consisting essentially of from about 50 to about 99 weight percent HFC-365mfc and from about 1 to about 50 weight percent water, which compositions have a boiling point of about 38° C.±about 1° C., at about 14.4 psia pressure. The preferred, more preferred, and most preferred compositions of the invention are set forth in Table 1. The numerical ranges in Table 1 are to be understood to be prefaced by the term "about".

TABLE 1

| Components | Preferred (wt %) | More Preferred (wt %) | Most Preferred (wt %) |
| --- | --- | --- | --- |
| HFC-365 mfc | 50–99 | 77–99 | 88–99 |
| Water | 1–50 | 1–23 | 1–12 |

In a particular embodiment, the invention further provides azeotropic compositions consisting essentially of about 98 weight percent 1,1,1,3,3-pentafluorobutane and about 2 weight percent water, which composition have a boiling point of about 38° C.±about 1° C. at about 14.4 psia.

In another embodiment, the invention provides blowing agent compositions comprising, consisting essentially of and consisting of the azeotropic or azeotrope-like compositions of the invention.

In yet another embodiment, the invention provides a method for producing polyurethane and polyisocyanurate foams comprising reacting and foaming a mixture of ingredients that react to form the polyurethane and polyisocyanurate foams in the presence of a volatile blowing agent comprising the azeotropic or azeotrope-like compositions of the invention.

FIGURE

FIG. 1 is a plot of k-factor as a function of water concentration in B-side of the formulation.

DETAILED DESCRIPTION

For purposes of this invention, azeotrope-like compositions are compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

Azeotrope-like compositions behave like azeotropic mixtures, i.e., are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotropic or azeotrope-like system so as to be outside of this invention is to distill a sample of the composition with the component under conditions that would be expected to separate a nonazeotropic mixture into its separate components. If the mixture containing the additional component is nonazeotropic or nonazeotrope-like, the additional component will fractionate from the azeotropic or azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like, or constant boiling. All such compositions are intended to be covered by the terms "azeotrope-like" and "constant boiling". As an example, it is well known that at differing pressures, the composition of a given azeotrope will vary at least slightly as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

In a process embodiment, the compositions of the invention are used in a method for producing polyurethane and polyisocyanurate foams. Any of the methods well known in the art such as those described in "Polyurethanes Chemistry and Technology," Volumes I and II, Saunders and Frisch, 1962, John Wiley and Sons, New York, N.Y. In general, the method comprises preparing polyurethane or polyisocyanurate foams by combining an isocyanate, a polyol or mixture of polyols, a blowing agent or mixture of blowing agents, and other materials such as catalysts, surfactants, and optionally, flame retardants, colorants, or other additives. The blowing agent or agents employed shall be a volatile mixture of the azeotrope-like compositions of the present invention.

It is convenient in many applications to provide the components for polyurethane or polyisocyanurate foams in preblended formulations. Most typically, the foam formulation is preblended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane or polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B component as described above.

Dispersing agents, cell stabilizers, and surfactants may also be incorporated into the blowing agent mixture. Surfactants, better known as silicone oils, are added to serve as cell stabilizers. Some representative materials are sold under the names of DC-193, B-8404, and L-5340 which are, generally, polysiloxane polyoxyalkylene block co-polymers such as those disclosed in U.S. Pat. Nos. 2,834,748, 2,917,480, and 2,846,458. Other optional additives for the blowing agent mixture may include flame retardants such as tris(2-chloroethyl)phosphate, tris(2-chloropropyl)phosphate, tris(2,3-dibromopropyl)-phosphate, tris(1,3-dichloropropyl) phosphate, diammonium phosphate, various halogenated aromatic compounds, antimony oxide, aluminum trihydrate, polyvinyl chloride, and the like.

Generally speaking, the amount of blowing agent present in the blended mixture is dictated by the desired foam densities of the final polyurethane or polyisocyanurate foams products. The proportions in parts by weight of the total blowing agent or blowing agent blend can fall within the range of from 1 to about 60 parts of blowing agent per 100 parts of polyol. Preferably from about 10 to about 35 parts by weight of HFC-365mfc per 100 parts by weight of polyol are used.

The compositions of the invention may also be used in a method of dissolving a contaminant or removing a contaminant from the surface of a substrate that comprises, consists essentially of, and consists of the step of contacting the substrate with the azeotropic or azeotrope-like compositions of the present invention.

Applicants have found that HFC-365 has the capacity of removing large amounts of water as an azeotrope. Since HFC-365 does not have high solubility/miscibility with water, and is more dense than water, it may be used to azeotropically dry compounds, particularly those that are temperature sensitive such as drugs and drug precursors, biochemicals, etc. To further increase the solubility of HFC-365 it may be advantageous to add a small amount, for example from about 1 to about 10 weight percent of a compatibilizing agent to aid in the drying process. Suitable compatibilizing agents may be selected from the group consisting of alcohols, ketones and ethers. Particularly suitable compatibilizing agents are acetone, methanol, ethanol, isopropanol, butanol, methyl tertiary butyl ether and the like.

The present invention is more fully illustrated by the following, non-limiting examples.

EXAMPLES

Example 1

An ebulliometer consisting of vacuum-jacketed tube with a condenser on top was used. About 20 g HFC-365mfc (b.p. 40° C. at 14.36 psia) were charged to the ebulliometer and water (b.p. 100° C. at 14.36 psia) was added in small, measured increments. The temperature was measured using a platinum resistance thermometer. From about 0 to about 12 weight percent water, the boiling point of the composition changed by only 1.6 to a minimum of about 37.95° C. From 12 weight percent water to about 23 weight percent water the temperature changed by less than 0.1° C.

Example 2

40 g of the azeotrope-like composition of the invention are charged into a 200 cc sealed vessel containing 3 g of Dow Styrene 685D. The vessel is placed in a 250° F. oven overnight. Twenty-four hours later, the vessel is removed from the oven and rapidly depressurized. The resulting foam is inspected and found to be of good quality.

Example 3

100 g of a polyether with a hydroxyl value of 380, a result from the addition of propylene oxide to a solution of saccharose, propylene glycol and water, is mixed with 2 g of a siloxane polyether copolymer as foam stabilizer, and 3 g of dimethylcyclohexylamine. With stirring, 100 g of the mixture is thoroughly mixed with 15 g of the azeotrope-like composition of the invention as blowing agent. The resulting mixture is foamed with 152 g of crude 4,4' diisocyanatodiphenylmethane. The resulting rigid foam is inspected and found to be of good quality.

Example 4

In this example, foams were prepared using the azeotrope-like compositions described in this invention as a foam blowing agent exhibits improved k-factors. In general the formulations used to prepare these foams are described in Table 3.

TABLE 3

| Component (pbw) | | | | | |
|---|---|---|---|---|---|
| Terate 2541[1] | 100.00 | 100.00 | 100.00 | 100.00 | 100.00 |
| Tegostab B8433[2] | 2.00 | 2.00 | 2.00 | 2.00 | 2.00 |
| Polycat 8[3] | 0.25 | 0.50 | 0.63 | 0.63 | 1.30 |
| Dabco K-15[3] | 2.80 | 3.80 | 5.60 | 6.50 | 5.80 |
| Water | 0.00 | 1.70 | 2.75 | 3.50 | 5.10 |
| HFC-365mfc | 38.00 | 25.50 | 20.50 | 17.30 | 0.00 |
| Lupranate M70L[4] | 150.10 | 215.60 | 258.70 | 307.00 | 342.70 |
| Index | 250 | 250 | 250 | 250 | 250 |

[1]Polyol from COSA; hydroxyl number = 240
[2]Surfactant from Goldschmidt Chemical Company
[3]Catalyst from Air Products & Chemicals Inc.
[4]A Polymethylene poly(phenyl isocyanate) mixture containing about 40% by weight of methylenebis(phenyl isocyanate) with the balance being polymethylene poly(phenyl isocyanate) having a functionality greater than 2; ic = socyanate equivalent weight = about 134; from BASF Corp.

The same general procedure commonly referred to as "handmixing" is used to prepare all foams. For each blowing agent or blowing agent pair, a premix of polyol, Terate 2541, surfactant, Tegostab B8433, and catalyst, Dabco K-15 and Polycat 8, is prepared in the same proportions displayed in Table 3. About 2 kg is blended to insure that all of the foams in a given series are made with the same master batch of premix. The premix is blened in a one-gallon paint can, and stirred at about 1500 rpm with a Conn 2" diameter ITC mixer until a homogenous blend was achieved. When mixing is complete the material is transferred to a one-gallon glass bottle and sealed. The bottle was then placed in a refrigerator controlled at 50° F. The foam blowing agents were kept separately in the same refrigerator, along with the 32 oz. tin cans used for mixing vessels. The A-component, isocyanate, is kept in sealed containers at 70° F.

For the individual foam preparations, an amout of B-component equal to the formulation weight is weighted into a 32 oz. tin can preconditioned at 50° F. The required amounts of the individual blowing agents, also preconditioned to 50° F. ia added to the B-component. The contents are stirred for two-minutes with a Conn 2" ITC mixing blade turning at about 1000 rpm. Following this, the mixing vessel and contents are reweighed. If there is a weight loss, the lower boiling blowing agent is added to make up the loss. The contents are then stirred for an additional 30 seconds, and the can replaced in the refirgerator.

After the contents have cooled again to 50° F., approximately 10 minutes, the mixing vessel is removed from the refrigerator and taken to the mixing station. A pre-weighed portion of A-component, isocyanate, is added quickly to the B-component, the ingredients mixed for 10 seconds using a Conn 2" diameter ITC mixing blade at 3000 rpm and poured into a 8"x8"x4" cardboard cake box and allowed to rise. Cream, initiation, gel and tack free times were recorded for the individual polyurethane foam samples.

The foams are allowed to cure in the boxes at room temperature for at least 24 hours. After curing, the blocks are trimmed to a uniform size and the densities are measured. Any foams that did not meet the density specification 2.0±0.1 lb/ft$^3$ are discarded, and new foams prepared using an adjusted amount of blowing agent in the formulation to obtain the specified density.

After ensuring that all the foams met the density specifications, the foams are tested for k-factor according to ASTM C518. The k-factor results are displayed in FIG. 1.

It can be seen from FIG. 1 that azeotrope-like blends of HFC-365mfc and water as the foam blowing agent, particularly those containing about 2 weight water, exhibit dramatically improved k-factors over those containing traditional amounts of water (about 0.5 pbw). The improvement is unexpectedly non-linear. It is also surprising that the temperature curves cross as water content increase, indicating that k-factor improvement is further enhanced with temperature.

What is claimed is:

1. Azeotrope-like compositions consisting essentially of from about 1 to about 50 weight percent water and from about 50 to about 99 weight percent 1,1,1,3,3-pentafluorobutane, which compositions have a boiling point of about 38° C.± about 1° C. at about 14.4 psia.

2. The azeotrope-like compositions of claim 1 consisting essentially of from about 1 to about 23 weight percent water and from about 77 to about 99 weight percent 1,1,1,3,3-pentafluorobutane.

3. The azeotrope-like compositions of claim 1 consisting essentially of from about 1 to about 12 weight percent water and from about 88 to about 99 weight percent 1,1,1,3,3-pentafluorobutane.

4. The azeotrope-like compositions of claim 1 consisting essentially about 2 weight percent water and about 98 weight percent 1,1,1,3,3-pentafluorobutane.

5. A blowing agent composition comprising the azeotropic or azeotrope-like compositions of claim 3 or 4.

6. A method for producing polyurethane and polyisocyanurate foams comprising reacting and foaming a mixture of ingredients that react to form the polyurethane and polyisocyanurate foams in the presence of a volatile blowing agent comprising the azeotropic or azeotrope-like compositions of claim 3 or 4.

7. A closed cell foam composition prepared by foaming a polyisocyanate or polyisocyanurate in the presence of a blowing agent comprising the azeotropic or azeotrope-like compositions of claim 3 or 4.

8. A premix of a polyol and a blowing agent comprising the azeotropic or azeotrope-like compositions of claim 3 or 4.

9. A method of dissolving a contaminant or removing a contaminant from the surface of a substrate that comprises the step of contacting the substrate with the azeotropic or azeotrope-like composition of claim 2 or 4.

* * * * *